US011504630B2

(12) United States Patent
Bress et al.

(10) Patent No.: US 11,504,630 B2
(45) Date of Patent: Nov. 22, 2022

(54) MASSIVELY-MULTIPLAYER-ONLINE-GAME AVATAR CUSTOMIZATION FOR NON-GAME MEDIA

(71) Applicants: Steven Bress, Germantown, MD (US); Daniel Bress, Germantown, MD (US); James Edward Dunstan, Fredericksburg, VA (US); Mark Bernard Jacobs, Fairfax Station, VA (US)

(72) Inventors: Steven Bress, Germantown, MD (US); Daniel Bress, Germantown, MD (US); James Edward Dunstan, Fredericksburg, VA (US); Mark Bernard Jacobs, Fairfax Station, VA (US)

(*) Notice: Subject to any disclaimer, the term of this patent is extended or adjusted under 35 U.S.C. 154(b) by 106 days.

(21) Appl. No.: 16/820,713

(22) Filed: Mar. 17, 2020

(65) Prior Publication Data
US 2020/0298129 A1 Sep. 24, 2020

Related U.S. Application Data

(60) Provisional application No. 62/819,676, filed on Mar. 18, 2019.

(51) Int. Cl.
*A63F 13/87* (2014.01)
*G06T 13/40* (2011.01)
*G06T 13/60* (2011.01)
*A63F 13/79* (2014.01)
*A63F 13/30* (2014.01)

(52) U.S. Cl.
CPC .............. *A63F 13/79* (2014.09); *A63F 13/30* (2014.09); *A63F 13/87* (2014.09); *G06T 13/40* (2013.01); *G06T 13/60* (2013.01); *A63F 2300/5553* (2013.01)

(58) Field of Classification Search
None
See application file for complete search history.

(56) References Cited

U.S. PATENT DOCUMENTS

2008/0215974 A1* 9/2008 Harrison ............... A63F 13/211
715/706
2017/0330228 A1* 11/2017 Kim ..................... A63F 13/86
2018/0161682 A1* 6/2018 Myhill ............... H04N 21/8173

* cited by examiner

*Primary Examiner* — Lawrence S Galka

(57) ABSTRACT

The present invention describes methods to customize massively-multiplayer-online-game (MMOG) Avatars beyond what can be displayed during general game-play. General game play refers to when a user is in a game with control of their Avatar. One knowledgeable in the art would understand that MMOGs are limited by their game engines to the complexity of Avatars that may be displayed to a user during general game-play, while maintaining acceptable frame rates. Furthermore one knowledgeable in the art would understand that Avatar complexity may further be limited due to the target machine the MMOG is designed to run on. The current invention describes methods to produce a custom Avatar image for non-game use, wherein the custom Avatar has higher resolution and greater choices than are available in-game.

13 Claims, 3 Drawing Sheets

Figure 1:
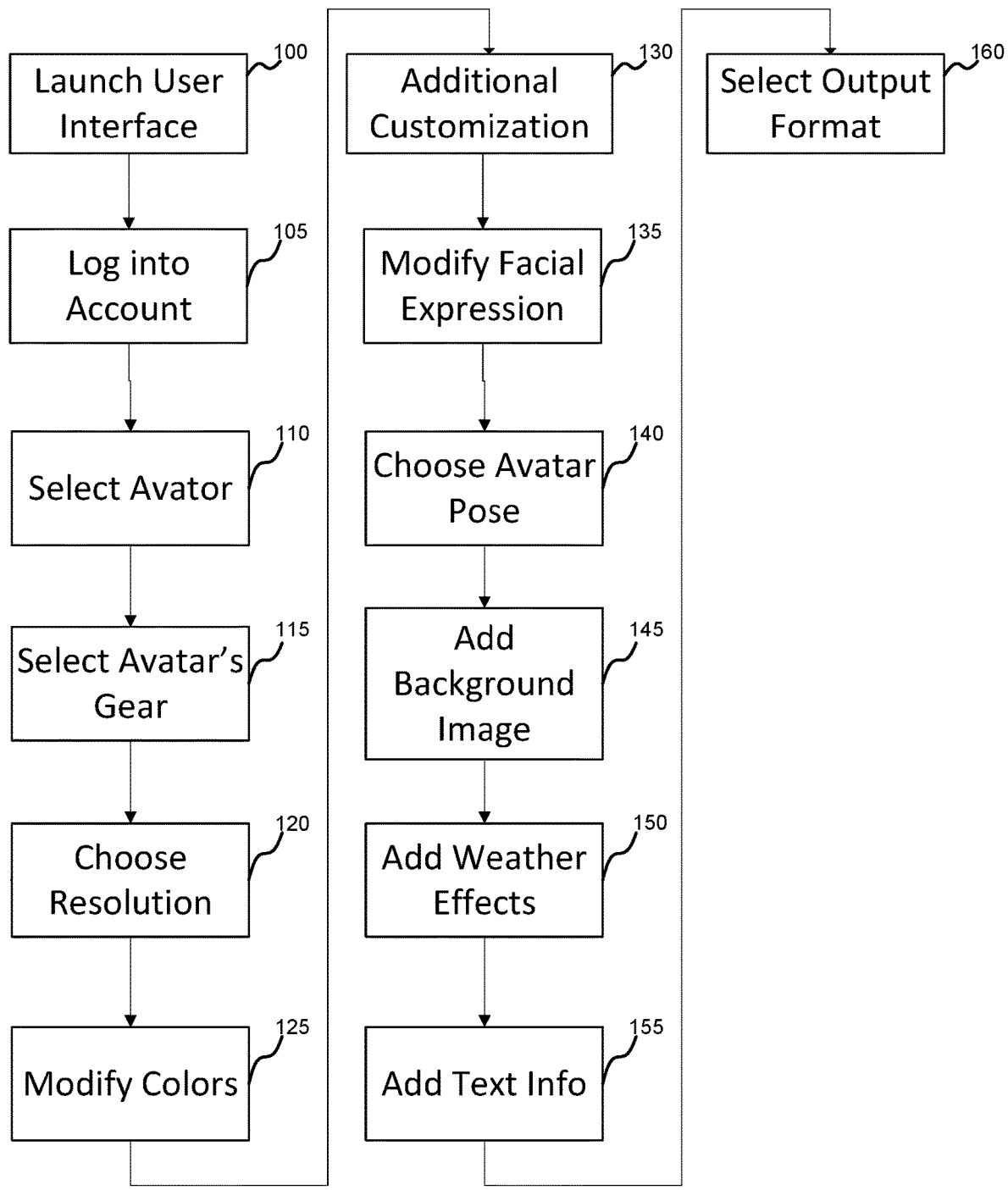

One Embodiment to Create a Static Image

MASSIVELY-MULTIPLAYER-ONLINE-GAME AVATAR CUSTOMIZATION FOR NON-GAME MEDIA

FIELD OF INVENTION

The present invention relates generally to massively-multiplayer-online-game Avatar customization for non-game media, such as 2-D images, 3-D images, clothing printing and general merchandise printing. The invention relates in particular to systems and methods for massively-multiplayer-online-game Avatar customization beyond the capabilities of said game to display during general game-play.

BACKGROUND

An Avatar is a graphical image that represents a person. The present invention describes methods to customize massively-multiplayer-online-game (MMOG) Avatars beyond what can be displayed during general game-play. General game play refers to when a user is in a game with control of their Avatar. One knowledgeable in the art would understand that MMOGs are limited by their game engines to the complexity of Avatars that may be displayed to a user during general game-play while maintaining acceptable frame rates. Furthermore, one knowledgeable in the art would understand that Avatar complexity may further be limited due to the target machine on which the MMOG is designed to run.

"World of Warcraft" (WoW) by Blizzard Entertainment allows a user to customize a Human Avatar with: 10 different skin colors, 12 different faces, 12 different hair styles, 10 different hair colors, and 9 different facial hair choices. A "Google" image search reveals hundreds of user-created static images with far more detail and complexity than available through WoW. These images are created using third-party software programs and are not generated by the WoW rendering engine. Users without these third-party software programs, or the artistic ability to use them, are not able to create images of their game Avatars that they desire.

There are currently methods to capture static and non-static Avatar images during MMOG game-play. However there are no methods to capture static and non-static Avatar images with greater customization than is available during game-play. For example, a user may desire a non-static image of her Avatar with greater customization than is currently available. For example, in a snowstorm, in front of a particular game location.

New technology produces new challenges. 3D printers are currently available that can print a 3-D image in millions of colors, such as the 3DPandoras 1.0. Currently there are no methods for a MMOG user to generate a file of their Avatar for use in a 3-D printer.

The discussion above is merely provided for general background information and is not intended to be used as an aid in determining the scope of the claimed subject matter.

As can be seen from the above discussion there is a need in the art to provide greater user Avatar customization for non-game media.

SUMMARY

Currently a user may take a screen shot or "selfie" to capture an image from a MMOG. This captured image has a number of deficiencies when used for non-game media.

The current invention is a User-Interface (UI) for a Massively-Multiplayer-Online-Game (MMOG) configured to allow a user to customize their Avatar for non-Game Media. This customization may include (but is not limited to) features such as greater Avatar resolution and greater Avatar color palette then said MMOG's game engine can display. Customization includes one or more of the following Customization Means in any combination:

Resolution. Display Resolution is limited by a MMOG game engine. In the preferred embodiment the current invention would only be limited by the resolution of existing game assets.

Additional Colors. The Colors of an Avatar's hair, skin color, eyes, gear, weapons, etc. are generally limited to a subset of available colors. In the preferred embodiment the current invention would include all available colors.

Additional Customization Assets. MMOGs limit the number of fixed assets such as an Avatar's Face, Haircut, Tattoos, Jewelry, etc. which are available to be displayed in the game engine. This limitation is not required for non-Game Customization. In the preferred embodiment the current invention would allow more choices of fixed assets, and additional assets not currently available.

Additional Facial Expression. MMOGs have predetermined limitations to an Avatar's facial expression. In the preferred embodiment customization of Facial Expression would be available such as happy, sad, determined, etc.

Additional Non-Specific Detail. MMOGs have predetermined limitations to non-specific graphical details of an Avatar. This limitation is not required for non-Game Customization. In the preferred embodiment customization such as an Avatar being dirty, muddy, snow covered, battle worn, etc. would be available.

Three Dimensions

In another embodiment, the current invention would further include means to save a 3D File of an Avatar.

Background Environment

In another embodiment, the current invention would further include a means to select a background from the MMOG's World Assets.

In a further embodiment, this background would be a higher resolution and/or color palette than is available to the game engine.

In a further embodiment, this background would be a sub-set of all available World Assets, limited to Locations that the Avatar has visited in the game world.

Non-Static Images

In another embodiment, the current invention would further include a means to save non-static images.

In a further embodiment, this non-static image would include Avatar motion. A user may select this motion from a set of gestures.

In a further embodiment, this non-static image would include weather effects such as snowstorm, rain, dust clouds, etc.

In a further embodiment, the means to save a non-static image would further include means to save a non-static image in a format appropriate for Lenticular Printing.

Color Tones

In another embodiment, the Colors available for an Avatar's Gear are limited to a set of Color Tones related to the in-Game color of said Gear. In some MMOGs, gear models are reskinned with different colors, said color indicating the Level of the gear. In this case it may be desirable to limit color choices to tones.

Official Approval

An Avatar's gear, for example, may indicate status. Thus it may be desirous that players have images limited to gear that their Avatar has earned in-game. Therefore there may be a need to indicate that a non-game image has followed the rules and restrictions set forth by the MMOG and not modified by a user. This may include, but is not limited to, a "digital watermark" or other "seal of approval."

In another embodiment, there is a means to indicate that the Customized Image is created from the current invention.

Avatar Information

In another embodiment, the current invention would include additional information about the Avatar such as the Avatar's name, server played on, game level and/or game accomplishments.

Player Created Assets

In another embodiment, the current invention would include means to allow a user to import their own artwork into the UI. For example, due to limitations of the game engine, Guild Logos are only selectable from a limited number of fixed assets. For non-game images, a user may desire to create their own logo.

In a further embodiment, the current invention would include means for the MMOG to approve or deny user imported images. Some users may attempt to import inappropriate images and, MMOGs need a way to protect their Brand.

In a further embodiment, the current invention would include means for a monetary transaction for a user to submit proposed user imported artwork. Approving artwork requires a certain amount of man-hours, it is appropriate for the user to pay for these man-hours.

Housing and Artifacts

In a further embodiment, the current invention would further include means for customization of player housing and artifacts.

RFID

In another embodiment, the current invention includes the inclusion of an RFID chip when images are used to create physical objects. These physical objects may include, but are not limited to: T-shirts and 3-D models. These physical objects may be as "tickets" to game events and/or provide game-related benefits such as a Wii Amiibo.

Other technical advantages will be readily apparent to one skilled in the art from the following descriptions and claims. Moreover, while specific advantages have been enumerated above, various embodiments may include all, some or none of the enumerated advantages.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. This Summary is not intended to limit the current invention in any fashion. The claimed subject matter is not limited to implementations that solve any or all disadvantages noted in the background.

DETAILED DESCRIPTION

Definitions

Pre-determined limitations. Pre-determined limitations refers to graphical limitations in massively-multiplayer-online-game (MMOG). These limitations may include but are not limited to resolution and color choices.

Fixed Assets. Fixed assets refers to graphic choices available for Avatar customization created by a Game company. For example, to insure an acceptable frame rate for users, a game may limit hair style fixed assets to ten choices. For Avatar Customization for non-Game Media there is no need to place a limit on the number of hair style fixed assets. Another example is that a game may limit items which are graphically displayed (such as rings in World of Warcraft) to insure an acceptable frame rate for users. For Avatar Customization for non-Game Media there is no need to place a limit on the number of hair style fixed assets.

DESCRIPTION

Embodiments of the current invention can be implemented in a variety of ways. The following descriptions are of illustrative embodiments, and constitute examples of features in those illustrative embodiments, though other embodiments are not limited to the particular illustrative features described.

The current invention provides advantages over existing screen captures and "selfies" available in current MMOGs in that the current invention is not limited to what a game engine can display.

The current invention is a User-Interface (UI) for a Massively-Multiplayer-Online-Game (MMOG) configured to allow a user to customize their Avatar for non-Game Media. This UI may be a toggle from existing customization/avatar creation UI or a separate new UI. The key element is that the current invention is not limited to graphics a game engine can display. Therefore the current invention allows a user greater freedom to create a truly personalized Custom Avatar.

Resolution.

Display Resolution is limited by a MMOG game engine. In "World of Tanks" by Wargaming Public Co Ltd. the maximum resolution available is 2600×1600. Tank Avatars do not take up the entire screen, so the actual Avatar resolution is lower. The available resolution generated by a game engine is limited and may not be high enough for some non-game applications. These applications may include, but are not limited to: posters, t-shirts, decals, blankets, 3D models and mouse pads.

Additional Colors.

"World of Warcraft" (WoW) allows a user to customize a Human Avatar with 10 different hair colors. The human eye can see greater than ten million colors. MMOGs limit the number of Avatar color choices to reduce stress on the game engine and reduce stress on a user's graphics system, while providing an adequate game frame rate. A non-game image is freed of these constraints and thus a greater number of colors can be offered to a user for Avatar customization. This Avatar color customization may include, but is not limited to: Hair, Skin, Eyes, Gear and Weapons.

Additional Customization Assets.

Some Avatar Customization Assets are available but limited in quantity. For example, WoW allows a Human Avatar: 12 different faces, 12 different hair styles, and 9 different facial hair choices. For non-game images the number of these assets may be increased. There are additional smaller Customization Assets which are either too small to display properly in the game engine and/or would stress the game engine to display, and thus not offered to a user. These additional smaller Customization Assets may include, but are not limited to: Tattoos, Jewelry, Fingernail color, Make-up and Scars.

Additional Facial Expression.

MMOGs have predetermined limitations to an Avatar's facial expression. For non-game images, the number of Facial Expressions may be increased. These expressions may include, but are not limited to: Confusion, Surprise, Shame, Focus, Exhaustion, Anger, Seduction, Fear, Sadness, Happiness, Disgust, Contempt, Frustration, Boredom, Embarrassment and Approval.

Additional Non-Specific Detail.

MMOGs have predetermined limitations to the non-specific detail appearance of an Avatar. This could also be described as an Avatar and her gear always looks new-out-of-the box. For non-game images an Avatar may be further customized with Non-Specific Detail. This Non-Specific Detail may be procedurally generated and applied to the Avatar. The Non-Specific Detail may include, but is not limited to showing an Avatar as being: Dirty, Dusty, Muddy, Wet, Snow covered and Battle worn.

3D

Currently there is not a method for a User to save a 3D File from a MMOG game engines. 3D printers are gaining in popularity and availability to MMOG users. Many users would create a 3D model of their Avatar if possible. Thus there is a need in the art to save a 3D file of a user's Avatar.

3D File Encryption is known in the art. Many 3D printers may accept 3D Encrypted files. It may be desirous for an MMOG to encrypt 3D images to be used for non-game purposes to protect the MMOG's 3D assets from unauthorized use.

Background Environment

For some non-game applications a user may prefer an Avatar image without a background. For other non-game applications a user may prefer an Avatar image with a background.

One method to include a Background in a non-game image would be to allow a MMOG user to take a screen capture in-game and use that image as a background for a non-game image. The disadvantage to this method is the background image would have resolution and colors limited by the game engine.

An improvement to this method would be to allow a user to select a background and then have the background rendered by a non-game engine with greater resolution and colors than the in-game engine. This selection could be done in various ways, including but not limited to a user: typing in an x,y or x,y,z coordinate and heading, and a user moving their character to a desired location and clicking a "choose background" button, similar to taking a screenshot.

The disadvantage of allowing a user to select a background from all of an MMOG's World Assets is that it requires a non-game engine to render the image. This method also requires World Assets that have greater resolution and/or colors than used in the game engine. Therefore it may be desirable to limit available Backgrounds available to a user. In the case where Backgrounds are limited, they may be offered from user favorite locations, including but not limited to, City Gates, Dungeon Entrances, Raid Termini, and World Portals.

In an MMOG, one player motivation is "bragging rights," as evidenced by WoW's Achievements. As non-game images may be used a "bragging rights" it may be desirable to limit the backgrounds available for an Avatar to ones that the Avatar has visited in-game.

Non-Static Images

A user may desire a non-static image of their Avatar, for example as a desktop "home" image. One method to allow non-static image Avatar Customization would be to allow a user to choose a gesture from a pre-created set. In WoW these gestures are called "emotes" and include such gestures as: "belch," "blink," "bored," and "bye".

Another method to create a non-static image of an Avatar would be to create procedural generated world effects, including, but not limited to: rain, snow, lightning, fireworks, volcanic eruptions and dust clouds.

Lenticular printing is a technology which enables printed images to have an illusion of depth and/or the ability to change or "move" as the image is viewed from different angles. Lenticular printing is becoming increasingly common and may be used, but not limited to: posters, cups, trading cards, signage and gift cards. Non-static images for Lenticular printer must be saved in a suitable format.

Color Tones

"Bragging Rights" in an MMOG include the appearance of an Avatar's Gear. In some MMOGs, gear models are reskinned with different colors, said color indicating the Level of the gear. In this case it may be desirable to limit gear Customization color choices to tones of the original in-game color.

Official Approval

There currently exists a lot of MMOG fan art. It is relatively easy for an MMOG user to take a screen capture of her Avatar and modify the captured image in a non-game image program, such as Adobe Photoshop. For user "bragging rights" and for a MMOG to protect its brand, it may be desirable to include a means to identify that an image was created from the current invention in a non-game image.

Avatar Information

When creating a non-game image it may be desirable to include an Avatar's name and Server/World. It may be desirable to limit the name and server to the in-game name and server to avoid unwanted words in the non-game image, as in-game names are usually screened by a game company.

Player Created Assets

Some users desire more Avatar customization than discussed above. These users may desire to create their own artwork to customize their Avatar. This artwork may include, but is not limited to: Guild Logos, heraldry and tattoos. In WoW, Guild Logos are only selectable from a limited number of fixed assets. For non-game images a user may desire to create their own Guild logo. In this case there may be a means to import a user created image into the current invention's UI.

The biggest problem with allowing users to import their own artwork for non-game images is that some users will attempt to import inappropriate artwork. Even though the non-game images will not appear in-game, due to social networks and MMOG forums it may be expected these non-game images will be seen by a significant number of MMOG players. Inappropriate artwork may degrade a player's game experience, and thus lead to lost revenues for an MMOG. Furthermore a MMOG may desire to protect their "Brand" by excluding certain inappropriate artwork. Therefore, there is a need to have a means for the MMOG to approve or disapprove user-created artwork for non-game images.

Reviewing user-created artwork for non-game images requires a certain amount of time for the review plus a certain amount of time for customer support if the image is not approved. One method of recouping the cost of this review may be to offer the review as a monetary transaction.

Housing and Artifacts

Some MMOGs, such as "Camelot Unchained" by City State Entertainment, LLC, allow users to create custom housing in-game. This is a very popular feature. Some users may desire to have non-game images of their custom housing for non-game uses. One knowledgeable in the art would realize that the means to produce non-game images of Custom Housing is similar to the means to produce non-game images of custom Avatars.

RFID

Non-game images may be used to create physical objects, including but not limited to: T-shirts, bandannas, and 3-D models. These physical objects may have RFID chips embedded in them. These physical objects with RFID chips may give a user an advantage in-game, in a similar fashion to a Nintendo "Amiibo". These physical objects may be used as "tickets" to game or game sponsored events. One knowledgeable in the art would understand that there are multiple uses for RFID encoded physical objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

DETAILED DESCRIPTION OF THE DRAWINGS

FIG. 1. Shows a logic flow for creating a customized static image

Figure 2:
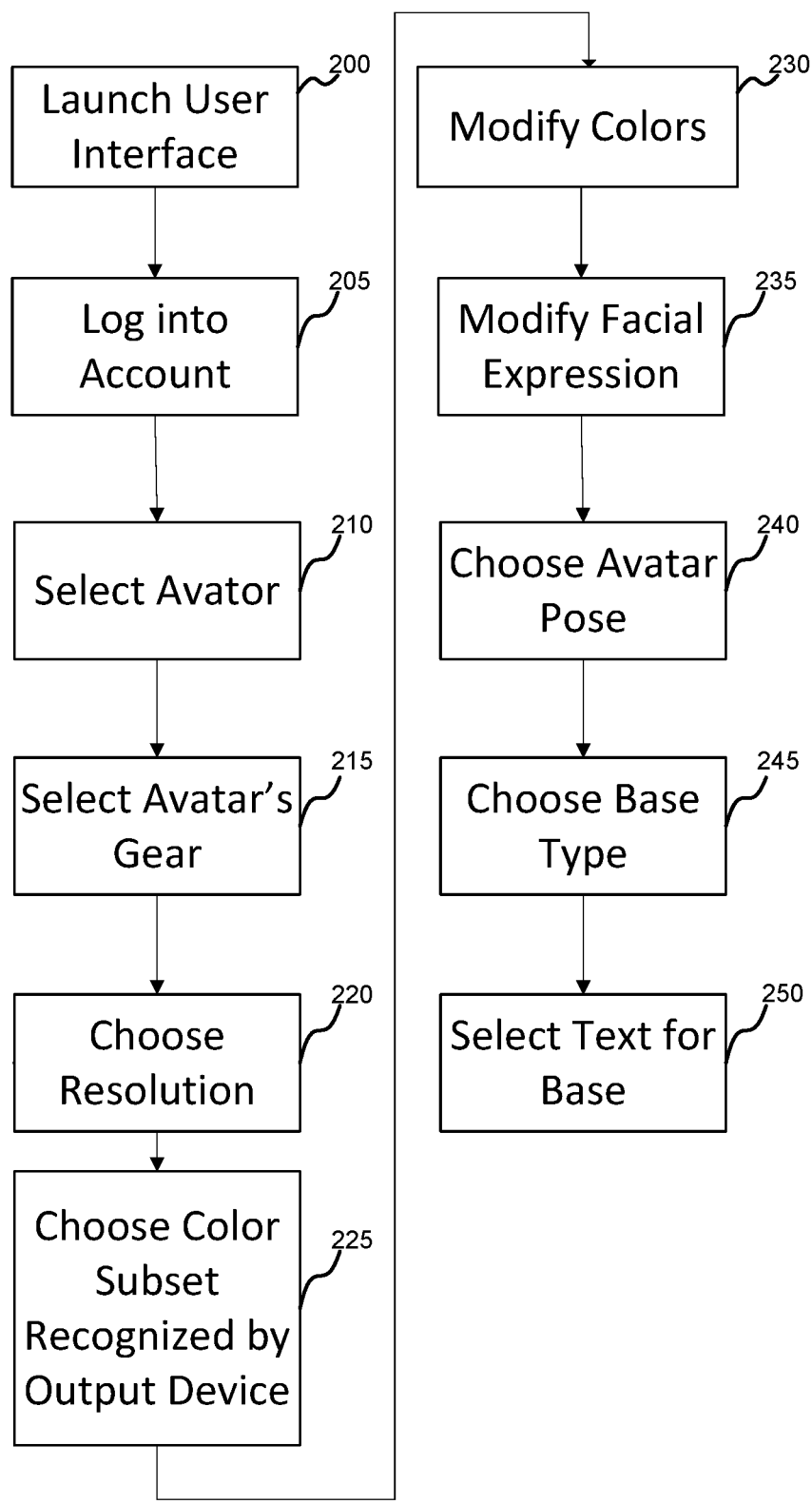

FIG. 2. Shows a logic flow for creating a 3D figure model

Figure 3:
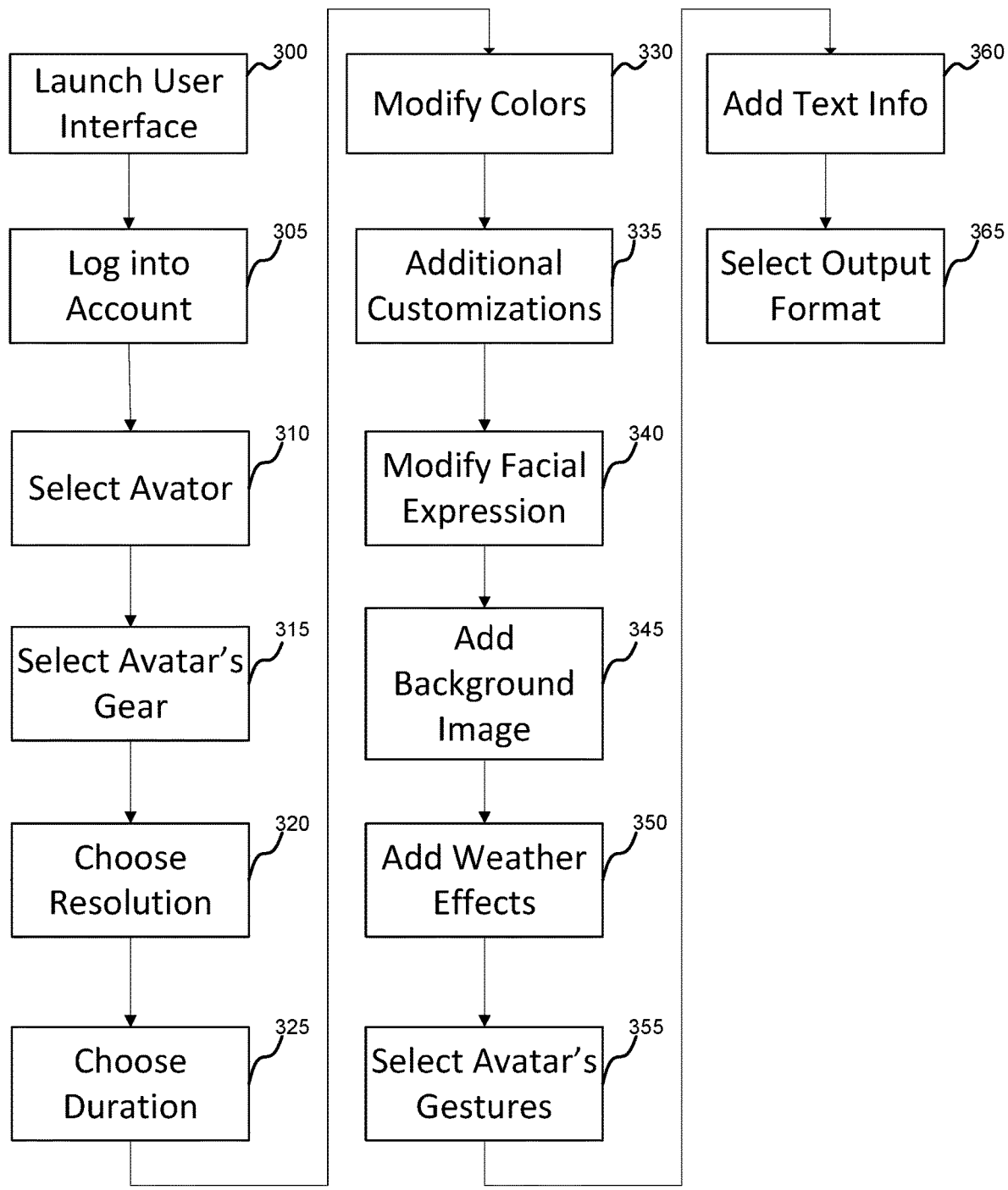

FIG. 3. Shows a logic flow for a non-static image.

STATIC IMAGE

For creating a customized Static image, the user starts by launching the user interface 100 on a computer. Virtually all of the MMOGs on the market require that the user logs in 105 to access his/her account. Often, accounts will have more than one character, with each character being represented by a different avatar. The user interface presents the available avatars 110. The user further customizes the look of the Avatar by selecting from the gear available to the character 115. The user may select the appropriate output resolution for the new Static image 120.

Customizations to colors related to the Avatar may also be available 125. Color customizations may include options to change hair color, skin color, weapons and other gear. These customizations are not restricted to solid colors. Patterns and other types of textures may be available. An example would be adding a camouflage texture to a weapon. Some additional Avatar customizations may include such things as tattoos, hair style and jewelry 130.

The facial expressions for the Avatar may be changed 135. Facial expressions may include sad, happy, and determined. The pose for the Avatar may be specified 140. A background image may be specified for the static image 145. Typically, this image would be either from the game or representative of it. The background image may be further customized with weather effects 150. These may include such things as snow, rain, or dust storms. Textual information may be specified for the static image 155. This may include such things as the Avatar's name, its servers' name and the Avatar's level in the game. When all of the settings have been specified to the User's satisfaction, the static image's file format and storage location may be specified and the static image generated 160.

3D Figure

For creating a customized 3D Figure, the user starts by launching the user interface 200 on a computer. Generally, the user must log in 205 to access his/her account. Often, accounts will have more than one character, with each character being represented by a different avatar. The user interface presents the available avatars 210. The user further customizes the look of the Avatar by selecting from the gear available to the character 215. The user may select the appropriate output resolution for the new 3D FIG. 220. For 3D models, different types of output devices may be optimized for different levels of detail. This is similar to the resolution that would be specified in a static image.

Depending on the use for which the 3D Figure is being created, there may be different color options. A simple 3D filament based printer may only support a single color. A higher end printer may support thousands of colors within a certain color range. A subset of available colors may be specified to best match the capabilities of the 3D output Device 225.

Customizations to colors related to the Avatar may also be available 230. Color customizations may include options to change hair color, skin color, weapons and other gear. These customizations are not restricted to solid colors. Patterns and other types of textures may be available. An example would be adding a camouflage texture to a weapon. Any customizations may be restricted to the selected color subset 225.

The facial expressions for the Avatar may be specified or changed 235. Facial expressions may include sad, happy, and determined. The pose for the Avatar may be specified 240. A 3D figure that is to be rendered on a 3D printer may include a base so that the final model can stand on its own. Different size and shapes of bases may be selected. In some cases, a base choice is more functional than decorative, while others tend more to the decorative. The selection is left to the preference of the user 245. The base may be further customized with text 250.

When all of the customizations are complete, the file for the 3D figure may be generated.

Non-Static Image

For creating a customized non-static, the user starts by launching the user interface 300 on a computer. Generally, the user must log in 305 to access his/her account. Often, accounts will have more than one character, with each character being represented by a different avatar. The user interface presents the available avatars 310. The user further customizes the look of the Avatar by selecting from the gear available to the character 315. The user may select the appropriate output resolution for the new non-static image 320.

Since this is for a non-static image, a duration needs to be specified 325. The duration depends on the use for the non-static image. A lenticular print tends to use very few frames while video clips can use many.

Customizations to colors related to the Avatar may also be available 330. Color customizations may include options to change hair color, skin color, weapons and other gear. These customizations are not restricted to solid colors. Patterns and other types of textures may be available. An example would be adding a camouflage texture to a weapon.

Additional Customizations may be available and may be specified 335. For a non-static image, this may include such features as colors that change over time. A feature such as this would allow for a background to "glow" or even have a glint of light appear on a sword. Similar to static image, facial expressions may be specified 340. Unlike the static images, an expression may be animated, such as the Avatar winking or smirking.

A background image may be specified 345. The background may be animated, such as snow falling on the scene.

The Avatar's gestures may also be specified 355. Gestures may include, but are certainly not limited to, raising a weapon, waving, and even dancing. Text information may be added as well 360. Like other effects, the text is not limited to being static and may have animation effects. Finally, the output format may be specified and the file saved 365.

What is claimed is:

1. An Avatar customization system comprising a computer program configured to:
   a. run on a client computing device connected to a host computing device,
   b. display a user-interface for a massively-multiplayer-online-game on the client computing, device, and
   c. access software and digital artwork on the host computing device, wherein said user-interface is configured to allow a user to customize an avatar for non-game use images comprising access to:
   a. avatar models with a higher polygon count than available in-game,
   b. avatar textures optimized for a higher resolution than available in-game,
   c. avatar color palettes greater than available in-game.

2. The Avatar customization system of claim 1 further comprising:
   access to more fixed assets on the Host than available in-game.

3. The Avatar customization system of claim 1 further comprising:
   access to more Avatar expressions on the Host than available in-game.

4. The Avatar customization system of claim 1 further comprising:
   access to procedurally generated non-specific environmental effects software on the Host to modify an Avatar image.

5. The Avatar customization system of claim 1 further comprising:
   access to software on the host to save a 3D custom Avatar file suitable for 3D printing.

6. The Avatar customization system of claim 1 further comprising:
   access to software on the host to limit a background image created from in-game locations, to in-game locations that an avatar has visited in-game.

7. The Avatar customization system of claim 1 further comprising:
   access to software on the host to create a non-static image.

8. The Avatar customization system of claim 1 further comprising:
   access to software on the host to select an avatar gesture not available in-game.

9. The Avatar customization system of claim 1 further comprising:
   access to software on the host to select weather effects.

10. The Avatar customization system of claim 1 further comprising:
    software on the host configured to limit the color choices of the avatar's gear to a subset of all available colors.

11. The Avatar customization system of claim 1 further comprising:
    access to software on the host configured to add additional avatar information to a non-game image or 3D print file.

12. The Avatar customization system of claim 1 further comprising:
    access to software on the host configured to modify the avatar with user-uploaded artwork.

13. Avatar customization system of claim 1 further comprising:
    access to software on the host to create anon-static image in a format suitable for Lenticular printing.

* * * * *